Patented May 16, 1950

2,507,833

UNITED STATES PATENT OFFICE 2,507,833

ALKYLSULFONIC ACID SALTS OF DIHYDRO-ERGOSINE

Arthur Stoll and Albert Hofmann, Basel, Switzerland, assignors to Sandoz Limited, Basel, Switzerland, a Swiss firm No Drawing. Application June 5, 1946, Serial No. 674,637. In Switzerland April 20, 1940

3 Claims. (Cl. 260—236)

The present invention is a continuation-in-part of our co-pending patent application, Ser. No. 385,198, filed March 25, 1941, now abandoned, which relates to sympatheticolytically active dihydro-derivatives of lysergic acid amides.

The present invention more particularly relates to the preparation of water-soluble salts of dihydro-ergosine. Dihydro-ergosine can be produced by treating ergosine with hydrogen under pressure in the presence of a suitable catalyst and of a solvent and, in some cases, at an elevated temperature, the method of production of dihydro-ergosine being described in our co-pending patent application, Ser. No. 385,198 (cf. Example 5 thereof).

The preparation of the new water-soluble salts of dihydro-ergosine can be carried out by neutralizing a solution or a suspension of dihydro-ergosine in a suitable solvent with alkyl-sulphonic acids. The salts thus obtained are generally beautifully crystallized compounds which are soluble in water and which are useful products for therapeutical purposes, the same being much better soluble in water than the dihydro-ergosine itself.

The following examples, without being limitative, describe the present invention.

Example 1

5.49 parts by weight ($1/100$ mol) of dihydro-ergosine are dissolved in 100 parts by volume of methanol and treated with 10 parts by volume of n-methylalcoholic solution of methane-sulphonic acid. By concentrating this solution in vacuo, a thick pap of crystals will be obtained. The crystal-pap is diluted with some ether and filtered, whereby the dihydro-ergosine methane-sulphonate will be obtained practically with the quantitative yield and in form of white crystals in needle form. After drying in vacuo over calcium chloride the salt possesses the melting point of 227° C. with decomposition and responds to the formula $C_{30}H_{39}O_5N_5.CH_3SO_3H$. One part of this salt is soluble either in 50 parts of hot water or/and in 300 parts of cold water, yielding stable solutions. As compared to the dihydro-ergosine-tartrate it is much more readily soluble in water, as 1 part of the tartrate is only soluble either in 100 parts of hot water or in 500 parts of cold water.

Example 2

The dihydro-ergosine ethane sulphonate can be prepared in the same way as described in Example 1 by treating a solution of dihydro-ergosine in methanol with a methylalcoholic solution of ethane-sulphonic acid. The dihydro-ergosine-ethane-sulphonate possesses the brutto formula $C_{30}H_{39}O_5N_5.CH_3CH_2SO_3H$ and is very easily soluble in methanol and in ethanol. By diluting a concentrated solution of this salt in ethanol with ether, the dihydro-ergosine ethane-sulphonate crystallizes out in clear prisms that melt at 212° C. (corr.) with decomposition. 1 part of the new salt dissolves either in 50 parts of hot water or in 200 parts of cold water.

What we claim is:

1. The water-soluble alkylsulphonic acid salts of dihydro-ergosine of the general formula $$C_{30}H_{39}O_5N_5.alkyl-SO_3H$$

which products are crystallized compounds melting with decomposition and which yield stable aqueous solutions and are suitable for therapeutical use.

2. The water-soluble methane-sulphonic acid salt of dihydro-ergosine of the formula $$C_{30}H_{39}O_5N_5.CH_3SO_3H$$

which crystallizes from methanol in needles melting with decomposition at 227° C., one part of which is soluble in 50 parts of hot water and in 300 parts of cold water, yielding stable aqueous solutions and which is suitable for therapeutical purposes.

3. The water-soluble ethane-sulphonic acid salt of dihydro-ergosine of the formula $$C_{30}H_{39}O_5N_5.CH_3CH_2.SO_3H$$

which crystallizes from ethanol in clear prisms melting with decomposition at 212° C., one part of which is soluble in 50 parts of hot water and in 200 parts of cold water, yielding stable aqueous solutions, and which is suitable for therapeutical purposes.

ARTHUR STOLL.
ALBERT HOFMANN.

REFERENCES CITED

The following references are of record in the file of this patent:

UNITED STATES PATENTS

| Number | Name | Date |
|---|---|---|
| 2,086,559 | Kharasch | July 13, 1937 |
| 2,156,242 | Kharasch et al. | Apr. 25, 1939 |

OTHER REFERENCES

Helv. Chim. Acta, vol. 26 (1943), pp. 1570–1601.